United States Patent
Kauschke et al.

(12) 
(10) Patent No.: US 6,610,390 B1
(45) Date of Patent: Aug. 26, 2003

(54) NONWOVEN WITH NON-SYMMETRICAL BONDING CONFIGURATION

(75) Inventors: Michael Kauschke, Rimsting (DE); Mordechai Turi, Princeton Junction, NJ (US)

(73) Assignee: First Quality Nonwovens, Inc., State College, PA (US)

( * ) Notice: Subject to any disclaimer, the term of this patent is extended or adjusted under 35 U.S.C. 154(b) by 346 days.

(21) Appl. No.: 09/613,192

(22) Filed: Jul. 10, 2000

Related U.S. Application Data (63) Continuation-in-part of application No. 09/460,660, filed on Dec. 13, 1999, now Pat. No. 6,537,644, which is a continuation-in-part of application No. 09/374,825, filed on Aug. 13, 1999, now abandoned.

(51) Int. Cl.[7] .......................... D02G 3/00; B32B 27/14; D04H 1/00; D04H 13/00

(52) U.S. Cl. ....................... 428/198; 438/195; 438/196; 438/401; 442/325; 442/381; 442/382; 442/394; 442/401; 442/409

(58) Field of Search ................................. 428/195, 196, 428/198, 401; 442/328, 401, 381, 382, 394, 409

(56) References Cited

U.S. PATENT DOCUMENTS

| | | |
|---|---|---|
| 5,964,742 A | 10/1999 | McCormack et al. |
| 6,093,665 A | 7/2000 | Sayovitz et al. |

FOREIGN PATENT DOCUMENTS

| | | |
|---|---|---|
| WO | WO 99/53877 | 10/1999 |
| WO | WO 99/57355 | 11/1999 |
| WO | WO 01/00915 A1 | 1/2001 |

*Primary Examiner*—Cheryl A. Juska
*Assistant Examiner*—Christopher C Pratt
(74) *Attorney, Agent, or Firm*—Amster, Rosthstein & Ebenstein (57) ABSTRACT

A nonwoven has low tensile and high elongation in the first direction (typically the CD) and high tensile and low elongation in the second direction (typically the MD). The nonwoven has a plurality of bonding points defining a total bonding area along the second direction greater than along the first direction. Accordingly, the nonwoven has unbonded fiber portions and bonded fiber portions, with a bonded portion/unbonded portion ratio greater along the second direction than along the first direction. The bonding points are preferably either circular or oval in plan.

19 Claims, 13 Drawing Sheets

NONWOVEN WITH NON-SYMMETRICAL BONDING CONFIGURATION

CROSS-REFERENCE TO RELATED APPLICATION

This is a continuation-in-part of U.S. patent application Ser. No. 09/460,660, filed Dec. 13, 1999, now U.S. Pat. No. 6,537,644 itself a continuation-in-part of U.S. patent application Ser. No. 09/374,825 now abandoned, filed Aug. 13, 1999.

BACKGROUND OF THE INVENTION

The present invention relates to a nonwoven having a non-symmetrical bonding configuration yielding low tensile strength and high percent elongation in a first direction (e.g., CD) and high tensile strength and low percent elongation in a second direction (e.g., MD).

Spunbond nonwoven fabrics are made of continuous strands or filaments that are laid down on a moving conveyor belt in a randomized distribution. In a typical spunbond process, resin pellets are processed under heat to a melt and then fed through a spinnerette to create hundreds of thin filaments or threads. Jets of a fluid (such as air) cause the threads to be elongated, and the threads are then blown or carried onto a moving web where they are laid down and sucked against the web in a random pattern to create a fabric. The fabric then passes through a bonding station. Bonding is necessary because the filaments or threads are not woven together.

The typical bonding station includes a bonding roll defining a series of identical raised points (bonding points). These bonding points are generally equidistant from each other and are in a uniform symmetrical pattern extending in both the machine direction (MD) and the cross direction (CD).

Other nonwoven fabrics include fabrics made from staple fibers, meltblown fibers, carded fibers and short cut fibers. As used herein the terms "spun fibers" and "fibers" include the spun filaments described above, as well as staple fibers, meltblown fibers, carded fibers and short cut fibers.

A non-symmetrical bonding pattern could result in a fabric with an expected or standard elongation in one direction (e.g., MD), but increased elongation in the other direction (e.g., CD). This is a desired attribute in situations where minimal elongation is required in the machine direction and yet high elongation is required in the cross direction. For example, any elongation in the machine direction will disrupt the converting machines that are used to make diapers, while substantial elongation in the cross direction is desired to give each individual diaper some give around the wearer's waist.

Accordingly, it is an object of the present invention to provide a nonwoven having a non-symmetrical bonding configuration.

Another object of the present invention is to provide a nonwoven fabric which is highly extensible in a first direction (typically the CD) as compared to a second direction (typically the MD).

Another object is to provide such a nonwoven having low tensile strength and high percent elongation in the first direction (typically the CD), and high tensile strength and low percent elongation in the second direction (typically the MD).

It is also an object of the present invention to provide such a nonwoven which is simple and economical to manufacture, use and maintain.

SUMMARY OF THE INVENTION

It has now been found that the above and related objects of the present invention are obtained in a nonwoven having high elongation in a first direction (typically the CD) and low elongation in a second direction (typically the MD). The nonwoven has a plurality of bonding points defining a total bonding area along the second direction greater than along the first direction. The bonding points are closed figures elongated in the second direction and preferably selected from the group consisting of closed figures which are oriented in parallel along the second direction axis, or orientated transverse to adjacent closed figures along the second direction axis, or oriented in sets with proximate closed figures so as to form therebetween a closed configuration elongated in the second direction.

Figure 6A:
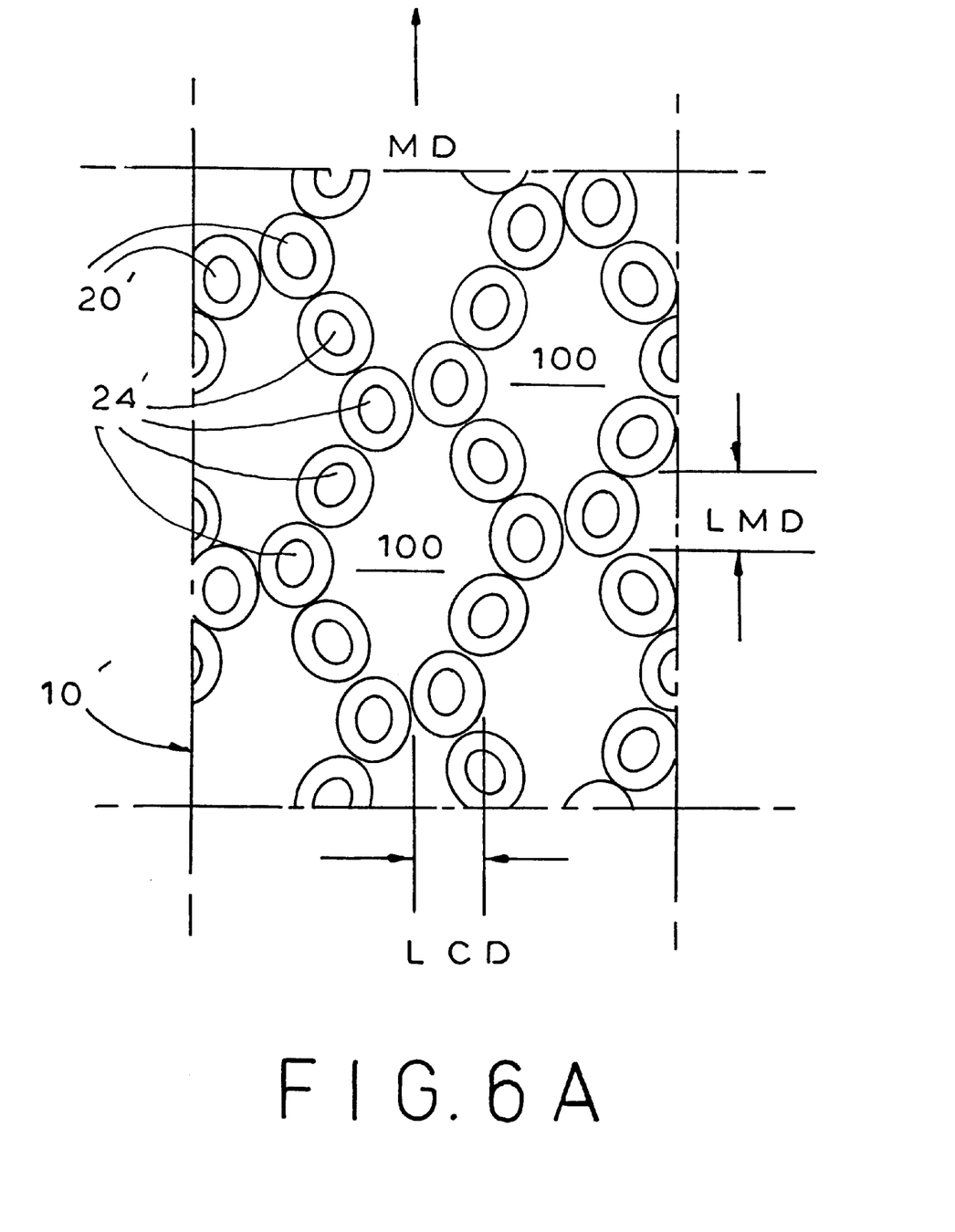
Figure 6B:
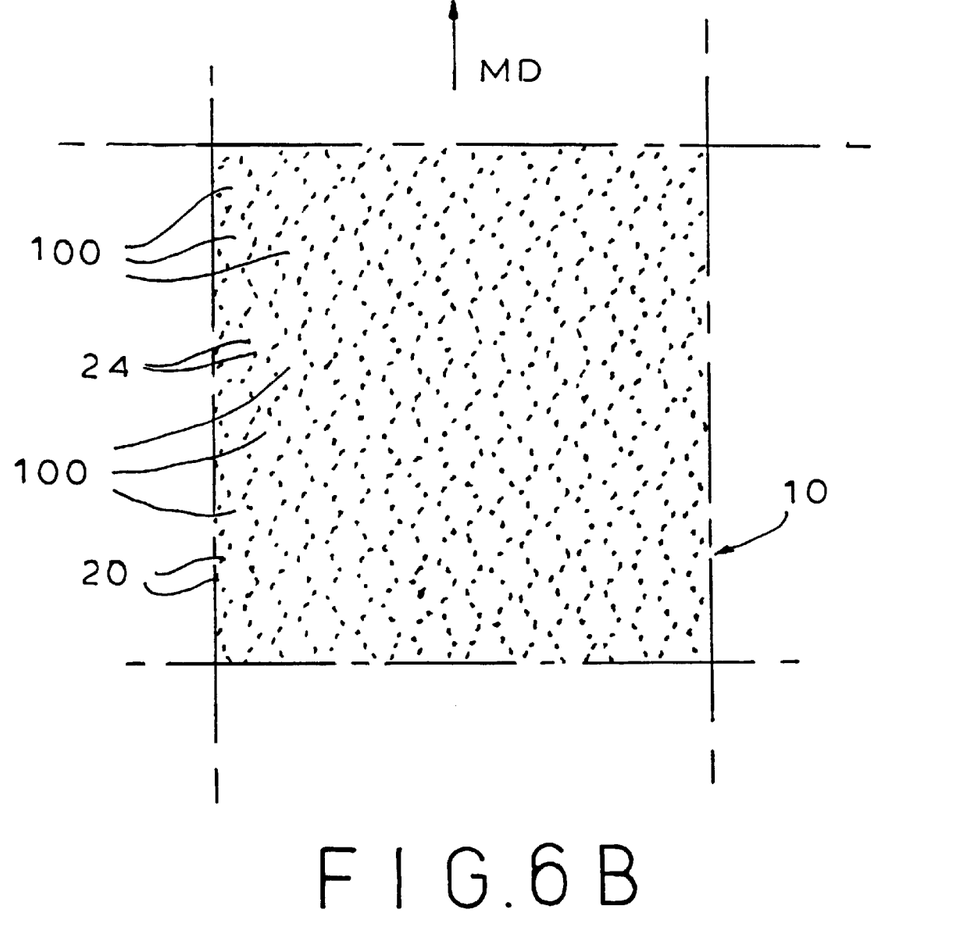

"FIGS. 2, 3, 4A, and 5A exemplify bonding point oriented transverse to adjacent closed figures along the second direction axis, while FIGS. 6A and 6B exemplify bonding points oriented in sets with proximate closed figures so as to form there between a closed configuration elongated in said second direction."

In a preferred embodiment, the total bonding area along the second direction is 1.1–5.0 times greater than along the first direction. The nonwoven has unbonded fiber portions and bonded fiber portions, with a bonded portion/unbonded portion ratio greater along the second direction than along the first direction. The first and second directions are mutually transverse, with the first direction preferably being the cross-direction (CD) and the second direction preferably being the machine direction (MD).

Where the bonding points are substantially circular, square or diamond shaped in plan, each of the bonding points are disposed closer to each other in the second direction than in the first direction. The bonding points define gaps of unbonded nonwoven between adjacent bonding points in the first direction of a length 1.1–3.0 times greater than the gaps of unbonded nonwoven between adjacent bonding points in the second direction.

Where the bonding points are substantially oval or rectangular in plan, each of the bonding points is elongated, extends at an angle less than 45 degrees relative to the second direction, and has an extension along the second direction 1.1–10.0 times greater than along the first direction. The bonding points define gaps of unbonded nonwoven between adjacent oval bonding points in the first direction of a length 1.0–3.0 times the length of the gaps of unbonded nonwoven between adjacent bonding points in the second direction.

The nonwoven is defined by substantially randomly oriented fibers, and is preferably a spunbond. The bonding points are produced by using an engraved bonding roll to form bonding points on the nonwoven.

The present invention further encompasses a laminate of nonwovens. The nonwoven laminate has an embossed pattern defining closed figures elongated in the second direction, preferably as defined above. In the laminating station a heated engraved hard roll is disposed adjacent one nonwoven and an unheated smooth soft roll is disposed adjacent the other nonwoven. The nonwoven has, after lamination, a high MVTR.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIGS. 7A and 7B are fragmentary schematics of the laminating stations used to produce a laminate of the nonwovens.

DETAILED DESCRIPTION OF THE PREFERRED EMBODIMENTS

Figure 1:
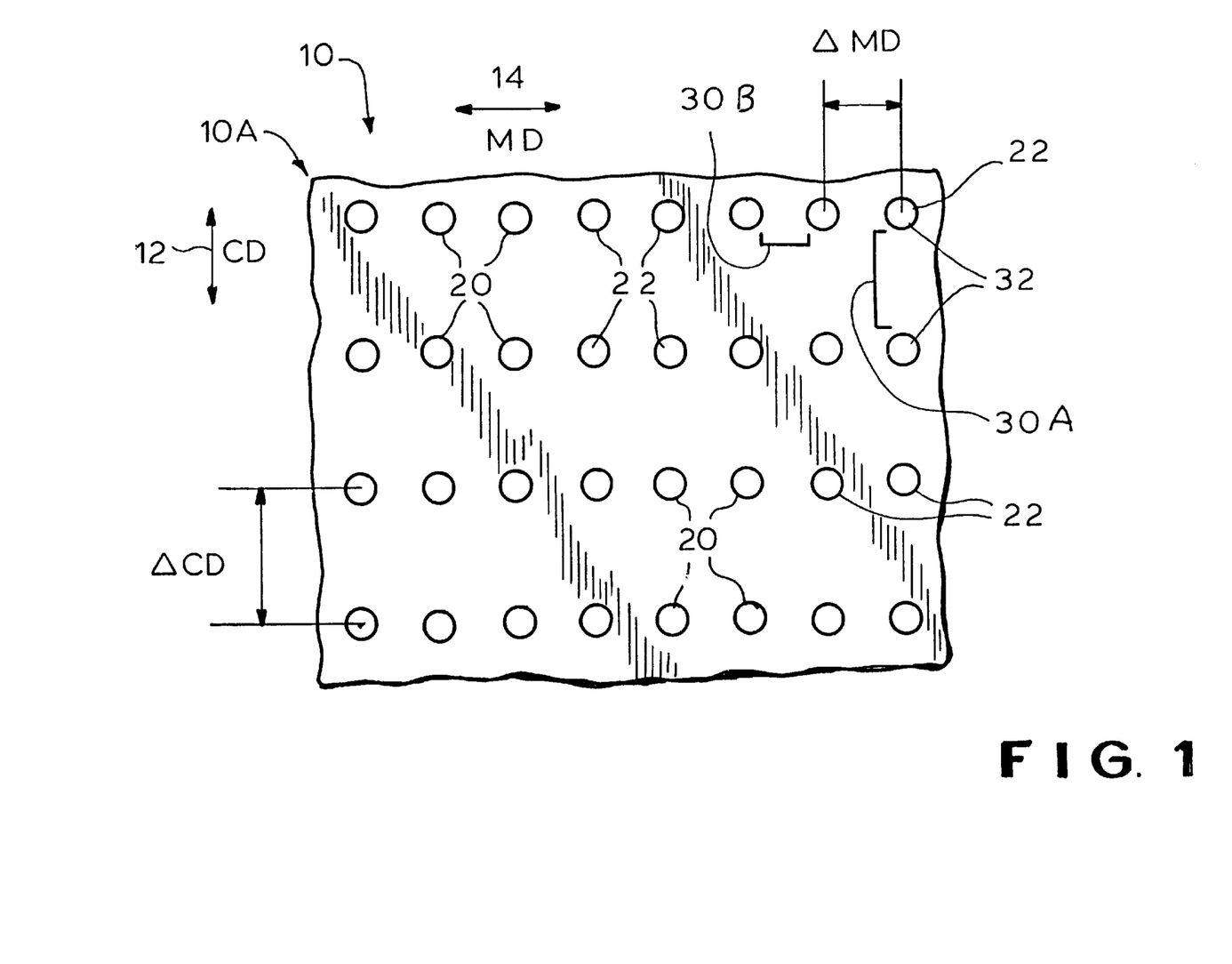
FIG. 1 is a fragmentary schematic top plan view of a nonwoven according to the present invention wherein the bonding points are substantially circular in plan.
Figure 2:
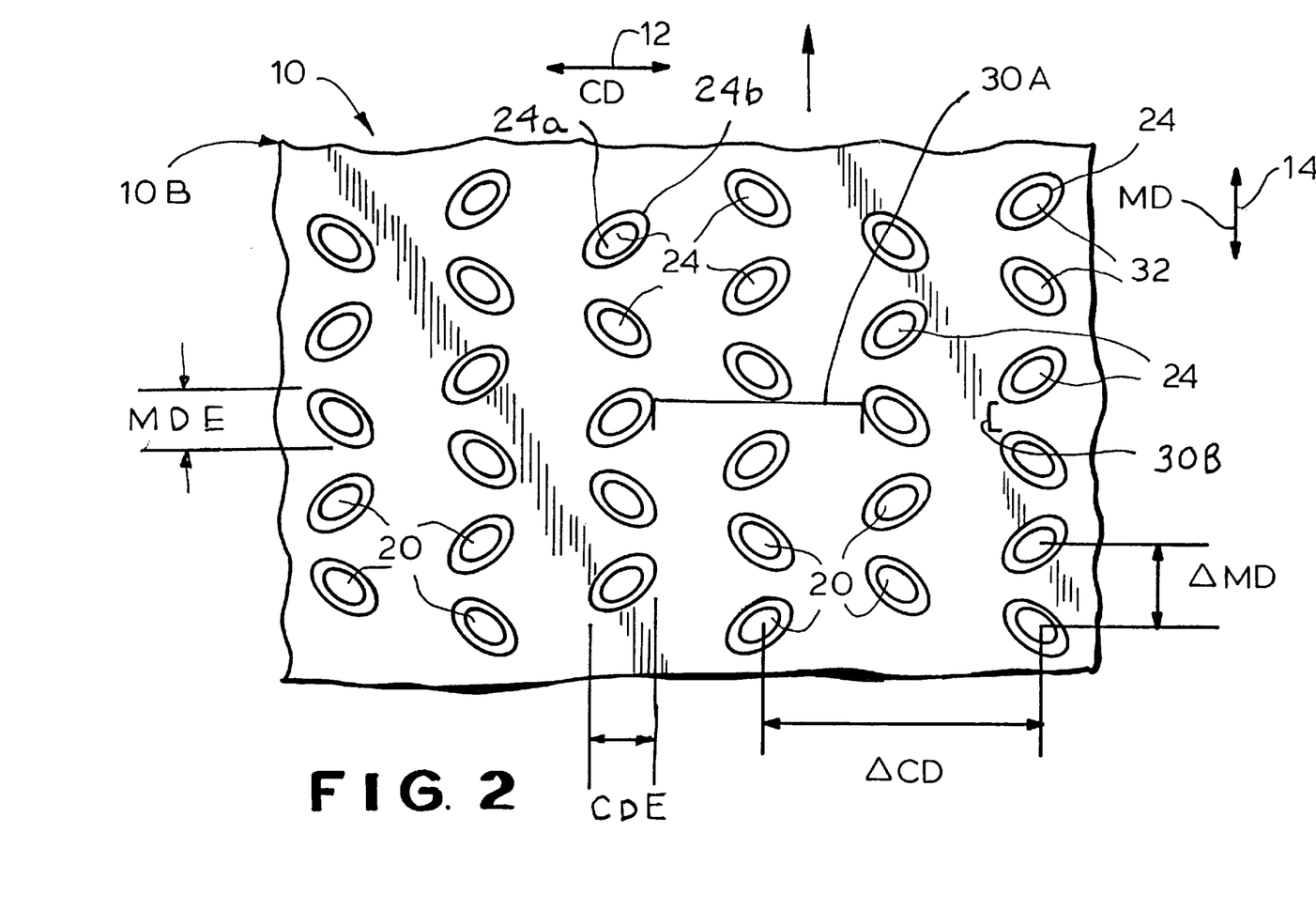
FIG. 2 is a fragmentary schematic top plan view of a nonwoven according to the present invention wherein the bonding points are substantially oval in plan.

Referring now to the drawing, and in particular to FIGS. 1 and 2 thereof, therein illustrated is a nonwoven according to the present invention, generally designated by the reference numeral 10. While the nonwoven 10 is preferably a spunbond fabric, it could be a meltblown fabric, a carded nonwoven fabric or any other type of nonwoven. In any case, the nonwoven 10 is defined by substantially randomly oriented spun fibers.

The nonwoven 10 has a low tensile strength and high percent elongation in a first direction 12 (illustrated by a double-headed arrow as the cross direction or CD) and a high tensile strength and low percent elongation in a second direction 14 (illustrated by a double-headed arrow as the machine direction or MD). The first and second directions are preferably mutually transverse (that is, they extend at right angles to one another), optimally with the first direction 12 being the cross direction (CD) and the second direction 14 being the machine direction (MD). Such a nonwoven is particularly desirable in the diaper-making industry where minimal elongation is required in the MD and yet high elongation is required in the CD. These properties facilitate manufacture of the diaper while providing comfort to the wearer about the waist. As will be appreciated by those skilled in the art, elongation of the nonwoven occurs intermediate the bonding points (and not at the bonding points).

The nonwoven 10 has a plurality of bonding points 20 defining a total bonding area along the MD 14 greater than along the CD 12. More particularly, the total bonding area along the MD 14 is preferably 1.1–5.0 times greater than along the CD 12.

The disposition of the bonding points 20 closer to each other in the MD 14 than in the CD 12 has the effect of increasing the tensile strength and decreasing the percent elongation of the fabric in the MD 14, relative to the tensile and elongation in the CD 12, thus allowing the fabric elongation along the CD 12 to exceed the fabric elongation along the MD 14.

The total bonding ratio may be calculated as follows: (a) Form an imaginary rectangle having a long dimension and a short dimension, the long dimension being aligned with and extending fully across the CD of the fabric. (b) Calculate the total bonding area formed by the bonding points within the rectangle. (This gives the bonding area along the CD.) (c) Re-orient the rectangle by 90 degrees so that the long dimension thereof is now aligned with the MD of the fabric. (d) Calculate the total bonding area formed by the bonding points within the rectangle. (This gives the bonding area along the MD.) These two bonding area measurements may then be used to calculate the ratio of the bonding areas in the CD and MD. Note that the long dimension of the rectangle must exceed the short dimension of the rectangle and is preferably twice the short dimension.

The bonding points 20 are preferably either substantially circular. (as illustrated in FIG. 1 by points 22) or substantially oval (as illustrated in FIG. 2 by points 24) in plan, although other shapes may be used.

Referring now to FIG. 1 in particular, in nonwoven 10A the circular bonding points 22 are disposed closer to each other in the MD 14 than in the CD 12. In other words, the center-to-center spacing of the circular bonding points 22 is greater in CD 12 (see ACD) than in the MD 14 (see AMD). The disposition of the bonding points 22 closer to each other in the MD 14 than in the CD 12 has the effect of increasing the tensile strength and decreasing the percentage elongation in the MD 14, relative to the tensile and elongation in the CD 12, thus allowing the elongation of the nonwoven fabric along the CD 12 to exceed the elongation of the nonwoven fabric along the MD 14.

Adjacent circular bonding points 22 define gaps 30A therebetween along the CD 12 having a length 1.1–3.0 times the length of the gaps 30B defined by the adjacent circular bonding points 22 in the MD 14. The magnitude of the gaps increases the elongation properties of the nonwoven 10, thus allowing the elongation along the CD 12 to exceed the elongation along the MD 14.

In a preferred embodiment, the circular bonding points 22 have a diameter of about 0.3–1.0 mm and a center-to-center separation of about 2 times the diameter in the CD and 1.5 times the diameter in the MD.

A particularly simple yet effective distribution of circular bonding points 22 involves the theoretical formation of a uniform pattern (that is, the center-to-center spacing of the circular bonding points 22 being uniform in both the MD and CD), and then removal of alternate lanes of the circular bonding points 22 extending in the MD, thereby to increase the relative center-to-center spacing in the CD, so that the final fabric has a greater percent elongation in the CD than in the MD. The same technique can be used with square or diamond shaped bonding points.

Referring now to FIG. 2 in particular, in nonwoven 10B the oval bonding points 24 have an extension MDE along the MD 14 which is preferably 1.1–10.0 times greater than the extension CDE along the CD 12. Where the extension MDE along the MD 14 exceeds the extension CDE along the CD 12, the resulting fabric has a higher tensile strength and a lower percentage elongation in the MD 14, relative to the tensile and elongation in the CD 12, thus allowing the elongation of the fabric along the CD 12 to exceed the elongation of the fabric along the MD 14. The oval bonding points 24 are elongated and preferably extend at an angle of less than 45 degrees relative to the MD 14. The oval bonding points may be disposed closer to each other in the MD 14 than in the CD 12, thus also allowing the elongation along the CD 12 to exceed the elongation along the MD 14.

The oval bonding point 24 is preferably annular in design (with the central portion 24a defining a plateau and the peripheral portion 24b defining a slope), and defines a bonded oval (including the annulus thereof) having a preferred length or major dimension of about 0.0347 in. (0.882 mm) and a preferred width or minor dimension of about 0.02 in. (0.526 mm). The center of an oval bonding point 24 is considered herein to be the intersection of its major and minor axes. The separation between the centers of adjacent oval bonding points 24 in the MD 14 (AMD) is preferably about 0.0598 in. (1.521 mm), and the separation between the centers of adjacent oval bonding points 24 in the CD 12 (ΔCD) is preferably about 3.5 mm.

Adjacent oval bonding points 24 define gaps 30A of unbonded nonwoven fabric therebetween along the CD 12 greater in length than the gaps 30B of unbonded nonwoven fabric defined by the adjacent oval bonding points 24 along the MD 14. The magnitude of the gaps of unbonded nonwoven fabric increases the elongation property of nonwoven 10, thus allowing the nonwoven elongation along the CD 12 to exceed the nonwoven elongation along the MD 14. Rectangular shaped bonding points could be used in place of oval shaped points.

Viewing the nonwoven 10 according to the present invention from a different perspective, the nonwoven 10 has unbonded fiber portions 30 characterized by the absence of bonding points 20 and bonded fiber portion 32 characterized by the presence of bonding points 20. The bonded portion 32/unbonded portion 30 ratio (in terms of surface area) is greater along the MD 14 than along the CD 12. The nonwoven of the present invention retains the expected softness, bulkiness, fiber tie down, abrasion resistance, bond strength and overall bonding area as prior art nonwovens.

Figure 2A:
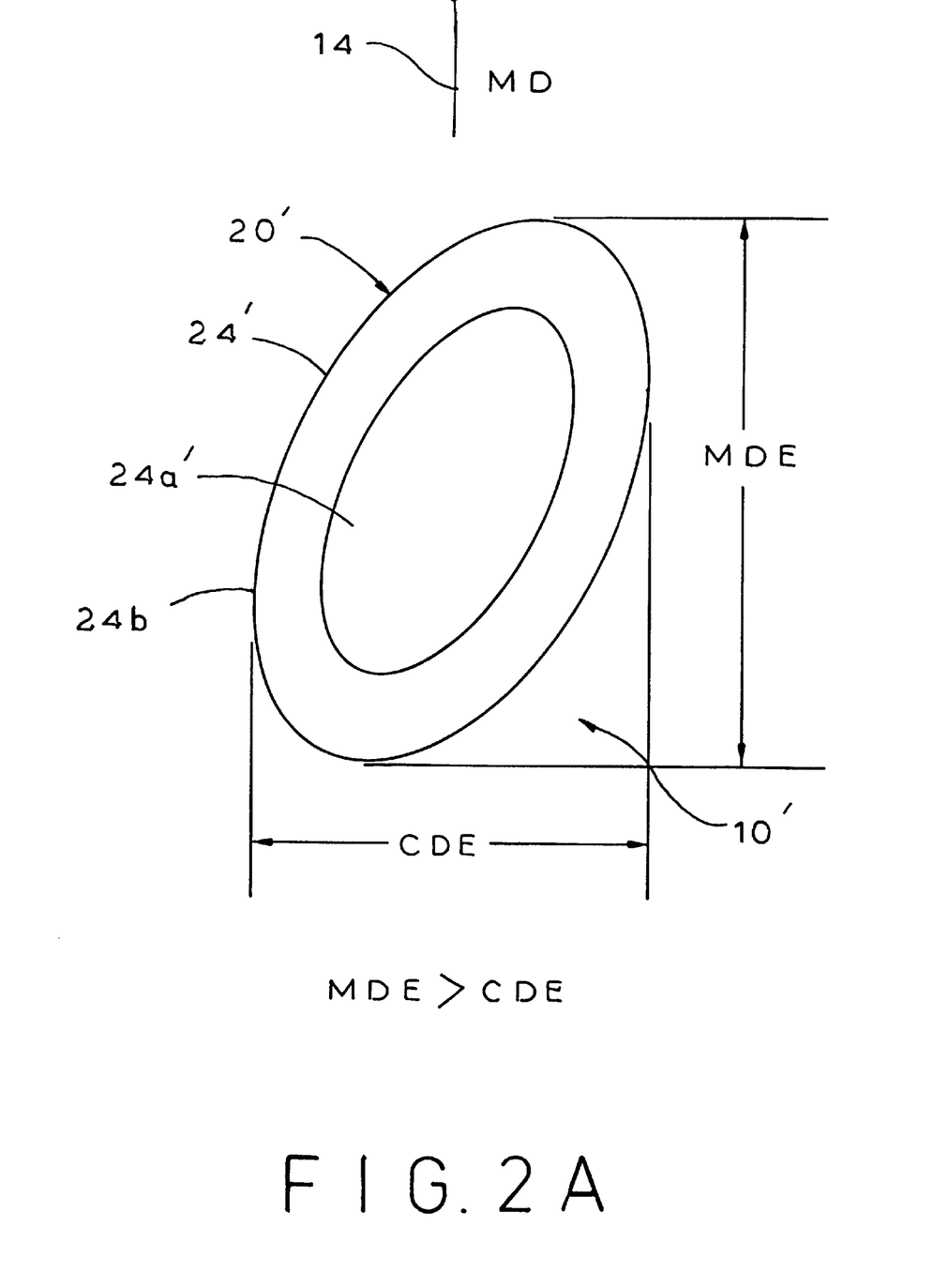
FIG. 2A is a schematic top plan view, to a greatly enlarged scale, of an oval bonding point on an engraved bonding roll.

Referring now to FIG. 2A in particular, the bonding points 20 on the nonwoven 10 are preferably produced by a thermobonding process using an engraved bonding roll 10' with pimples 20' thereon to form bonding points 20 on the nonwoven 10. Circular or oval bonding points 22 or 24 are preferred to polygonal bonding points. Further, each bonding point 20 may be a collection of smaller bonding points that are grouped together.

Spunbond nonwovens typically involve the use of thermofusion, chemical or mechanical bonding techniques to secure the spun fibers together, and the present invention is applicable to all such techniques. For example, in one bonding technique the fabric is passed between a smooth heated roller and an engraved roll which includes the required bonding point shape and/or pattern. In another bonding technique, the fabric is passed between an ultrasonic welding apparatus and the engraved roll. In another method adhesive is used to bind the spun fibers together at the bonding points.

As illustrated best in FIG. 2A, each pimple 20' on the engraved bonding roll 10' defines a raised center portion or a plateau 24a' which is surrounded by a sloped annulus 24b' providing for a relatively smooth transition between the plateau 24a' and the base level of the roll 10'. Preferably the slope of annulus 24b' is about 22°.

The nonwoven 10 of FIG. 1 does not show the circular bonding points 22 having an outer slope as part of the circular bonding point 22, corresponding to the sloped annulus of the circular bonding pimple. On the other hand, the nonwoven 10 of FIG. 2 does show such a sloped annulus 24b as part of the oval binding point 24. Actually, there may or may not be an area corresponding to the sloped annulus of a pimple 20', depending upon such factors as the natural resiliency of the nonwoven 10. Where the resiliency of the nonwoven 10 is low, it will accurately retain the configuration of the pimple 20' used to deform the nonwoven 10 (as illustrated in FIG. 2). On the other hand, where the resiliency of the nonwoven 10 is high, initially a sloped area or annulus 24b in the nonwoven, corresponding to the pimple annulus 24b', 10 is formed, but quickly the annulus 24b in the nonwoven becomes lost or masked as the resilient fibers only partially deformed by the pimple annulus 24b' spring back to their original configurations, thereby destroying the nonwoven annulus 24b and leaving only the fully depressed area 24a corresponding to the pimple plateau 24a'. It will be appreciated that this phenomenon occurs without regard to whether the bonding point 20 is a circle 22 or an oval 24. The remaining figures illustrating the nonwoven 10 will show a sloped area 24b corresponding to the annulus 24b' of the pimple 20', but it should be kept in mind that, where this is not desired, appropriate materials may be used so as to partially or entirely eliminate this area.

Figure 3:
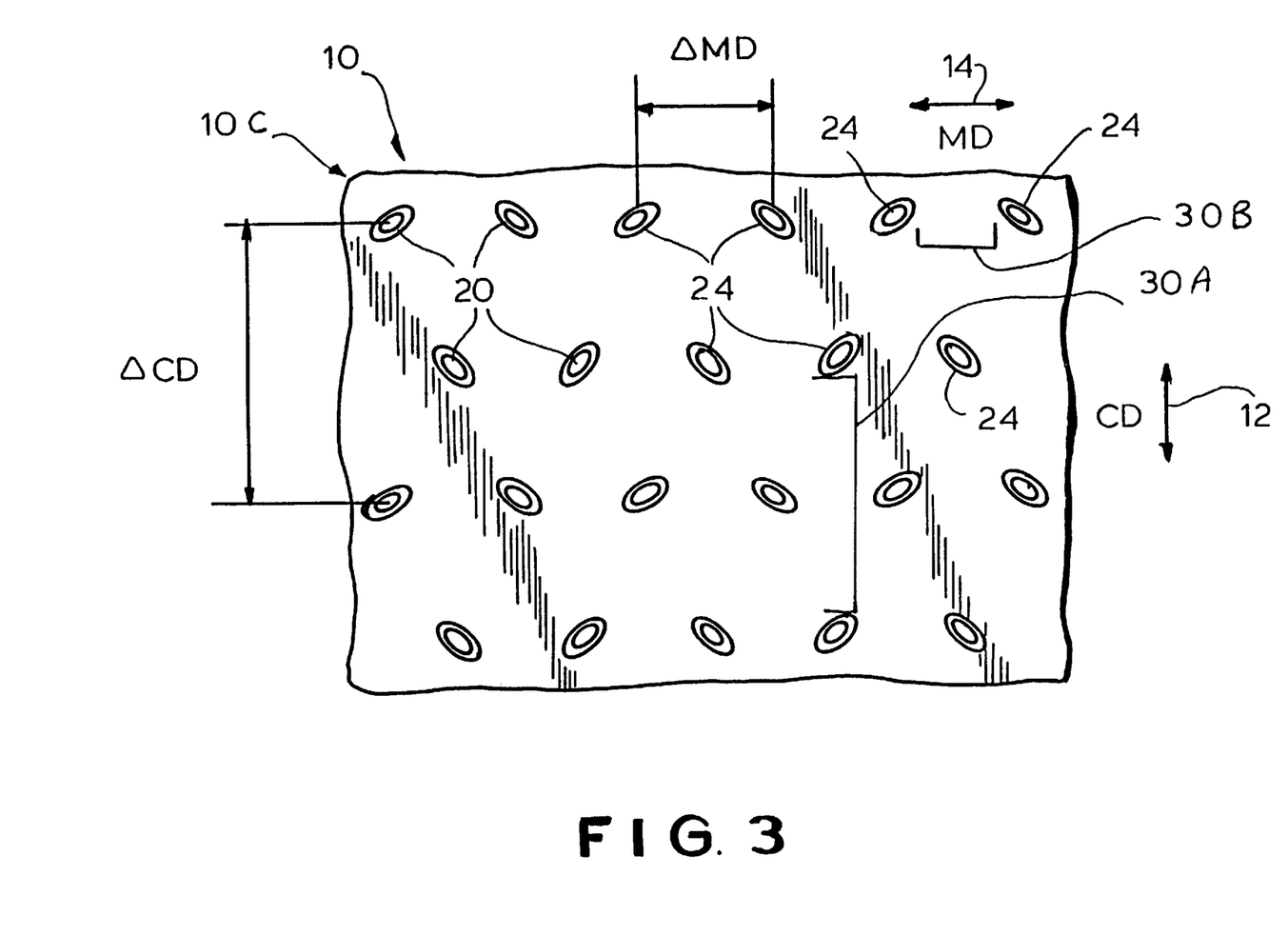
FIG. 3 is fragmentary schematic top plan view of an alternative pattern of bonding points on a nonwoven according to the present invention.

FIG. 3 schematically illustrates alternative nonwoven 10C according to the present invention. Clearly, square or polygonal (rectangular, hexagonal, etc.) bonding points may be used instead of oval or circular ones.

FIG. 3 shows a nonwoven 10C with a pattern using oval bonding points 24, which is a variant of that illustrated in FIG. 2. The oval bonding points 24 define gaps in the nonwoven between adjacent oval bonding points 24 in the CD 12 of a length 1.1–3.0 times the gaps defined between adjacent oval bonding points 24 in the MD 14.

In each of the patterns illustrated herein, the nonwoven has a plurality of bonding points defining a total bonding area along the MD greater than along the CD, so that the nonwoven exhibits low tensile and high elongation in the MD and high tensile and low elongation in the CD.

The nonwovens 10A–10C typically fall into one of two categories of non-symmetrical bonding pattern configurations. FIG. 1 with its circular bonding points 22 falls into the first category wherein the bonding point shapes are uniform in both the MD and CD (for each bonding point), but the pattern of the bonding points is non-uniform (here, because the ACD exceeds the AMD). Other uniform bonding point shapes include squares or diamonds. On the other hand, FIGS. 2 and 3 with their oval bonding points 24 fall into the second category wherein the bonding point shapes are non-uniform in the MD and CD (because the extension MDE in the MD 14 exceeds the extension CDE in the CD 12), and the pattern of the bonding points may be uniform or not. FIG. 2, with its oval points 24, falls in the second category. In FIGS. 2 and 3 the bonding pattern is non-uniform in the MD and CD which contributes to an increased elongation in the CD. In a uniform bonding pattern, the distance between bonding points in the machine direction (AMD) and the distance between bonding points in the cross direction (ACD) would be equal.

Utilizing a uniform diamond bonding point shape with a non-uniform bonding point pattern, specifically, a center-to-center separation of bonding points in the CD that is approximately 3.5 times greater than the center-to-center separation of bonding points in the MD, nonwoven fabrics of various weights (gsm or grams per square meter) were prepared and two inch wide by five inch long samples were tested for both elongation and tensile strength utilizing the EDANA test method ERT 20.2-89. The tests yielded the following results:

| Basis Weight | 10 gsm | 15 gsm | 20 gsm |
| --- | --- | --- | --- |
| MD tensile N | 18.19 | 20.25 | 27.95 |
| MD elongation % | 75.83 | 70.40 | 71.66 |
| CD tensile N | 8.50 | 11.48 | 16.07 |
| CD elongation % | 88.75 | 92.51 | 94.67 |

To enhance longevity of the engraving roll an overlapping pattern in the CD direction is preferred so that the engraving roll is always in contact with the nonwoven being bonded.

As used herein, "elongation" refers to the percentage elongation of a specimen at the breakpoint, and "tensile" refers to the ultimate tensile strength of a specimen at the breakpoint.

As will be appreciated by those skilled in the art, in order to effect changes in both the MD and CD properties, variations in the preliminary compositions, bonding parameters, and thermodynamic parameters (e.g., the drawing, cooling and quenching parameters) may be used. Such parameter changes affect both the MD and CD properties. By way of contrast, only a non-symmetrical bonding pattern minimizes the properties in one direction, while maximizing the properties in the other direction.

While the embodiments described hereinabove utilize bonding points 20 which are circular 22 or oval 24, it will be appreciated that a wide variety of shapes and configurations may be used for the bonding points 20. Indeed, bonding points of different shapes and configurations may be used on a single fabric. Similarly, while a variety of non-symmetrical bonding configurations have been shown in the various embodiments, it will be appreciated that other non-symmetrical configurations may be used instead. The critical limitation is that the shaping and configuration of the bonding points and/or the particular bonding pattern create a fabric which meets the goal of the present invention— namely, a high percent elongation in the first direction (typically the CD) relative to a low percent elongation in the second direction (typically the MD).

Figure 4A:
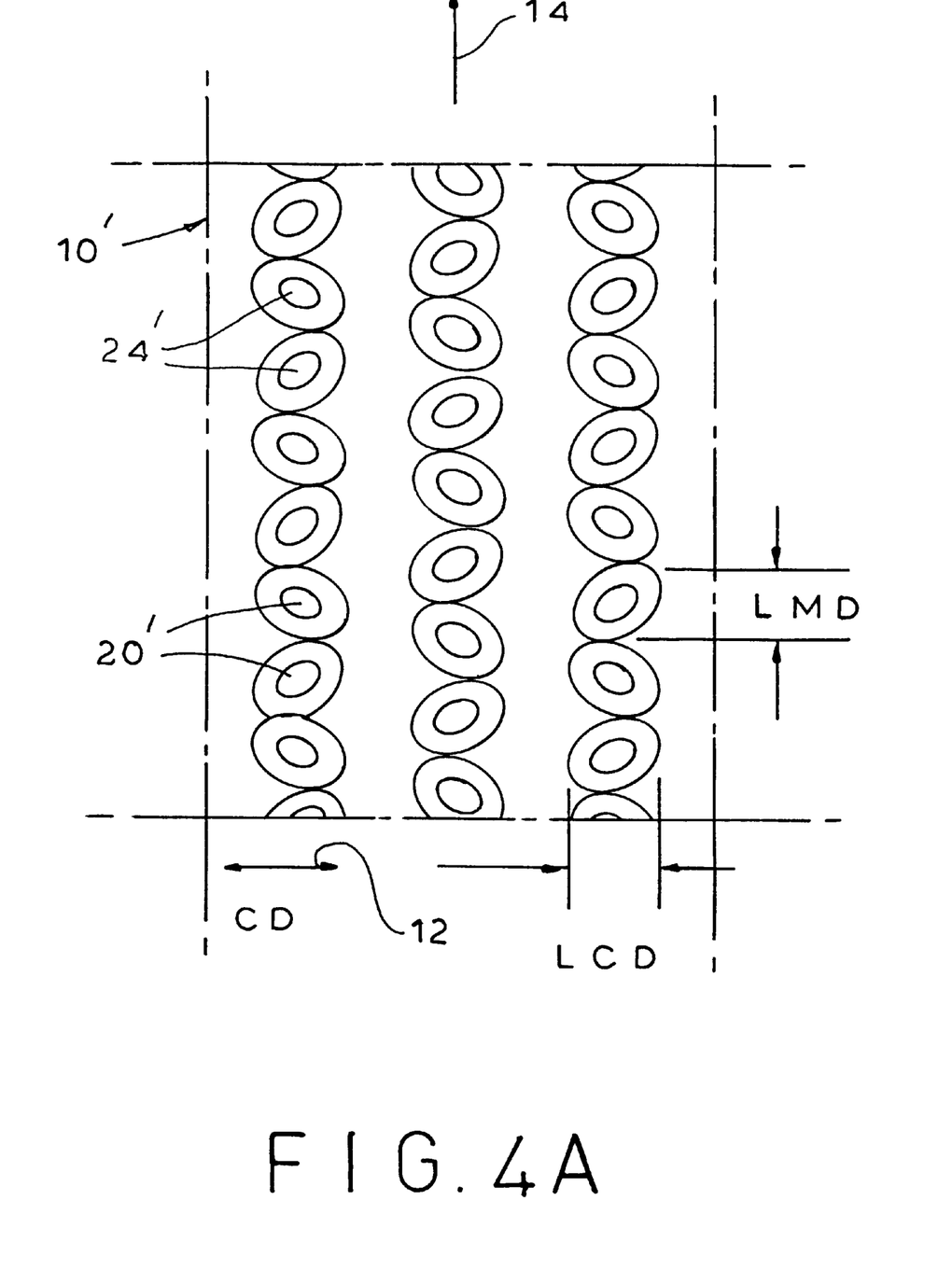
FIGS. 4A and 4B, 5A and 5B, 6A and 6B are fragmentary top plan views of an engraved bonding roll having elliptical or oval bonding points (to a greatly enlarged scale) and the resultant fabric produced thereby (to a greatly reduced scale), respectively.
Figure 4B:
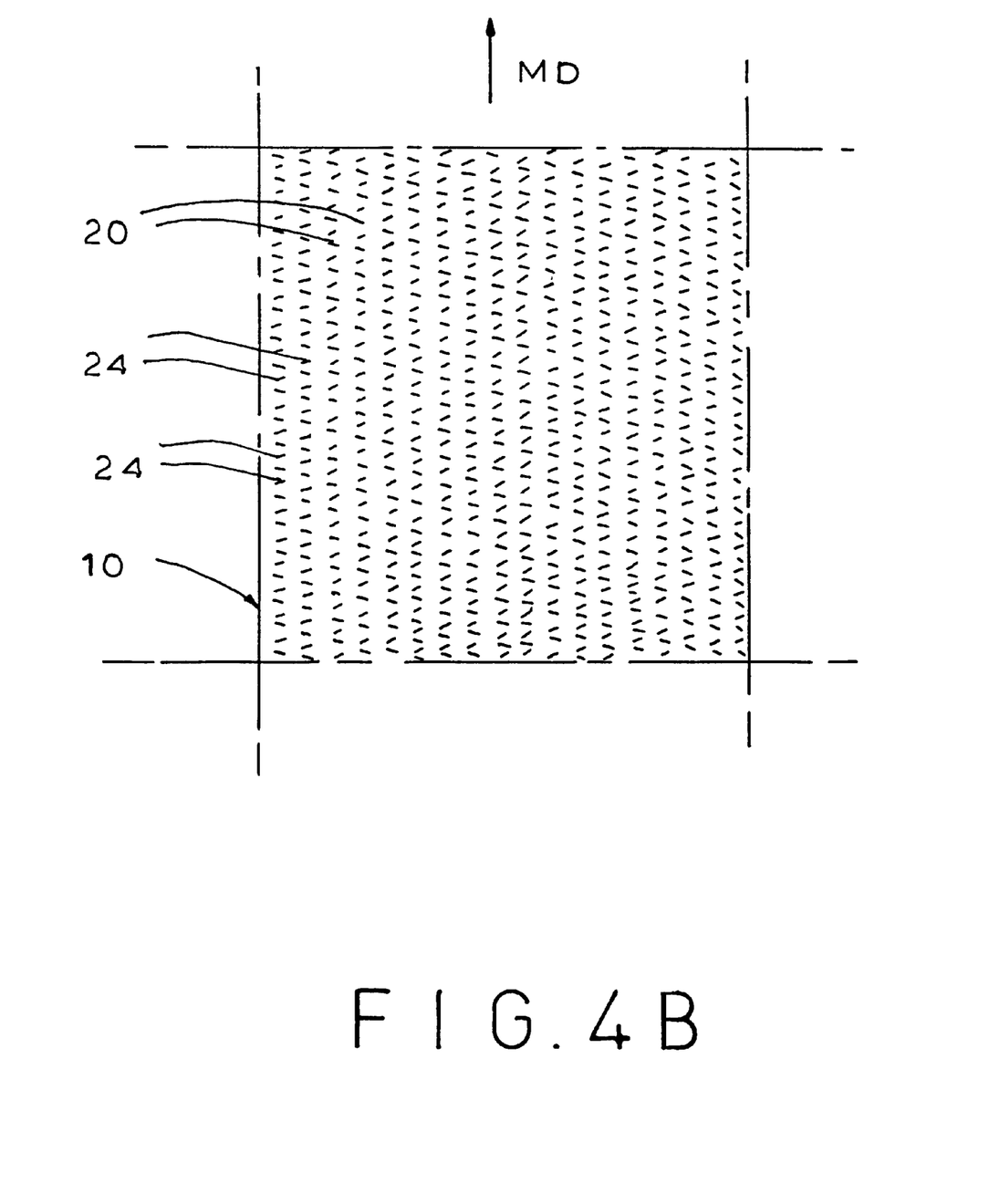
Figure 5A:
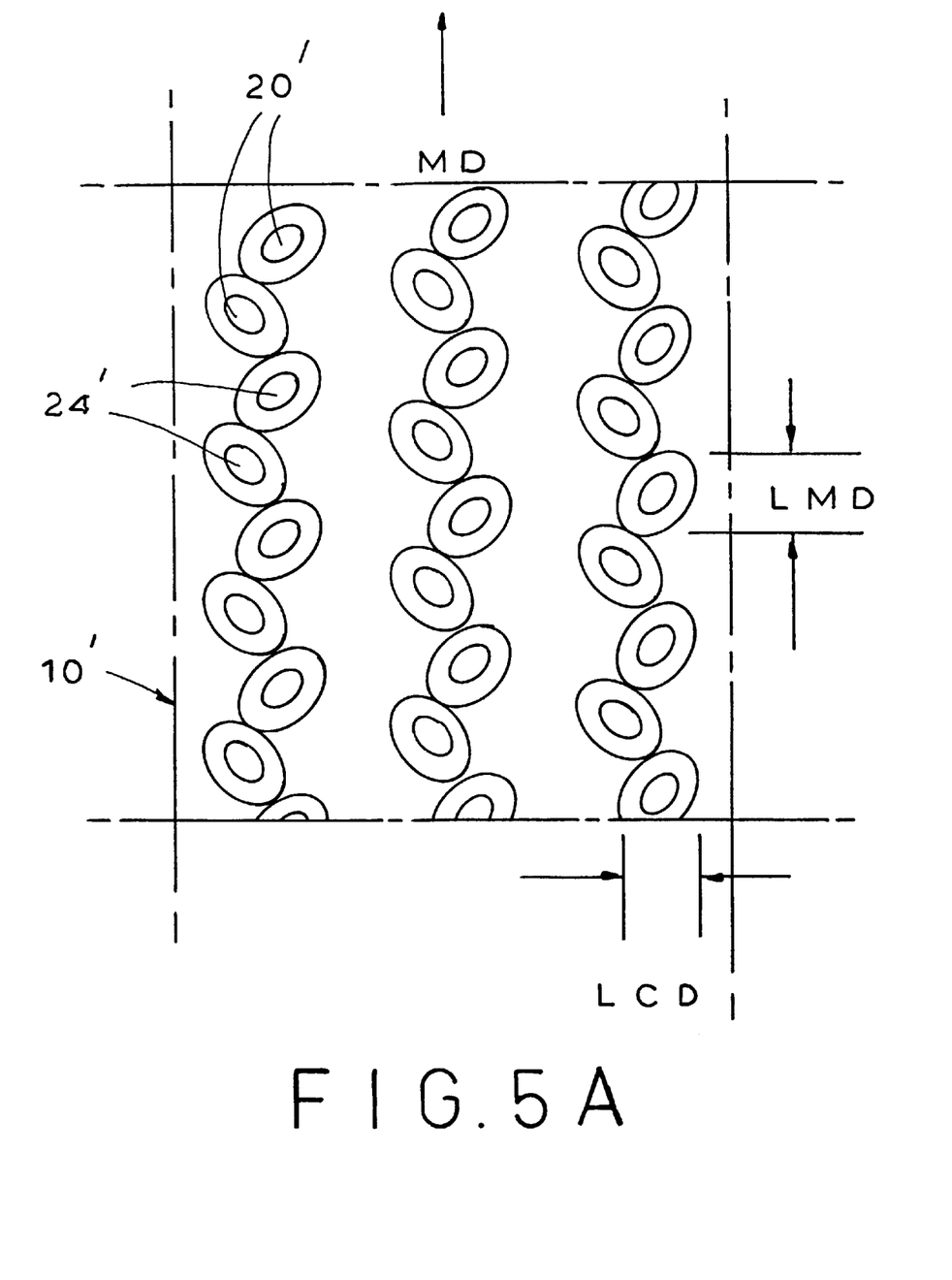
Figure 5B:
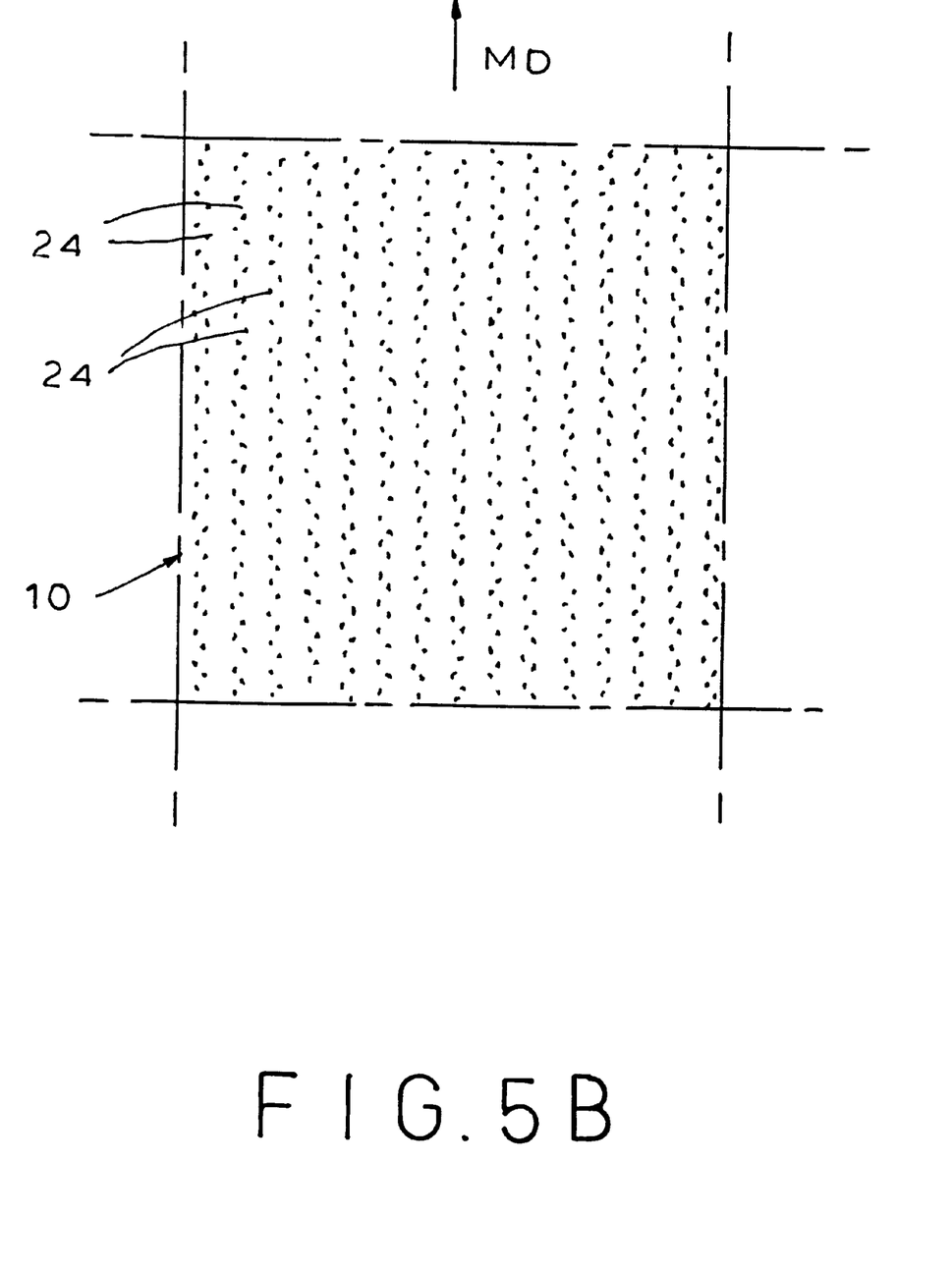

Referring now to FIGS. 4A and 4B, 5A and 5B, and 6A and 6B, the "A" figures are enlarged scale views of bonding points 20' of the engraving or patterning rolls 10', and the "B" figures are relatively reduced scale views of the patterned fabric 10 produced thereby. In FIGS. 4A and 4B, the closed ellipses or ovals 24, 24' are disposed in straight lines substantially aligned with the MD, in FIGS. 5A and 5B they are disposed in undulating lines substantially aligned with the MD, and in FIGS. 6A and 6B they are disposed in sets which are substantially aligned with the MD and in turn define other FIGS. 100. In each case the length of the closed figure areas 24 are greater in the MD (see $L_{MD}$) than in the CD (see $L_{CD}$).

The nonwoven fabric of the present invention is preferably formed by the selective bonding of substantially randomly oriented fibers initially providing a uniform fiber density in both the MD and CD so that any distinction between the MD and the CD properties arises out of the selective bonding process of the present invention. However, the selective bonding process of the present invention may also be applied to a nonwoven fabric which does not have a uniform fiber density in both the MD and the CD. See the inventor's copending U.S. patent application Ser. No. 09/373,826, filed Aug. 13, 1999 entitled "Nonwoven Fabric With High CD Elongation And Method Of Making Same". Where the non-uniform fiber density of the initial nonwoven fabric promotes a greater percent elongation in the CD than the MD, the use of the selective bonding pattern merely enhances the elongation ratio (that is, increases the ratio of elongation in the CD to elongation in the MD). Where the non-uniform density of the initial nonwoven fabric promotes a greater percent elongation in the MD than in the CD, the selective bonding of the present invention must be effective to overcome the initial bias and still cause the fabric to have a greater percent elongation in the CD than in the MD.

A preferred embodiment of the present invention provides a method of making a nonwoven fabric from spun fibers wherein the density of the bonding of the spun fibers in the fabric varies between strips of relatively high bonding density and strips of relatively low bonding density, the strips extending along the length of the fabric in the machine direction in an alternating pattern, with the high density strips separated from each other by low density strips. The alternating high density and low density strips across the cross direction provides the fabric with a higher percent elongation in the cross direction than in the machine direction.

An unexpected attribute of the fabric is an increased bulk density resulting in enhanced softness compared to symmetrically bonded nonwovens. In one example, a symmetrically bonded 15 gsm polypropylene spunbond fabric had one-half the thickness compared to a 15 gsm polypropylene spunbond fabric when bonded with the non-symmetrical pattern described herein.

Referring now to FIG. 7A in particular, the nonwoven 10 of the present invention may be used to form, with a spunbond 102, a laminate of nonwovens according to the present invention, generally designated 110. The nonwoven 10 has an embossed pattern of depressions and projections, with the pattern caused by the engraved bonding roll defining closed figures elongated in the second direction (e.g., MD). The spunbond 102 may have an embossed pattern as well. Preferably the laminating station, generally designated 104, includes a heated engraved hard roll 114 adjacent one nonwoven (preferably the nonwoven 10 according to the present invention) and an unheated smooth soft roll or "anvil" 112 adjacent the other nonwoven (preferably the spunbond 102), so that in the laminating station 104 the spunbond 102 will soften and enter the depressions of the nonwoven 10. After lamination, the nonwoven 10 (and indeed the laminate 110) has a high MVTR (moisture vapor transition rate) and substantially no holes therein.

Figure 7B:
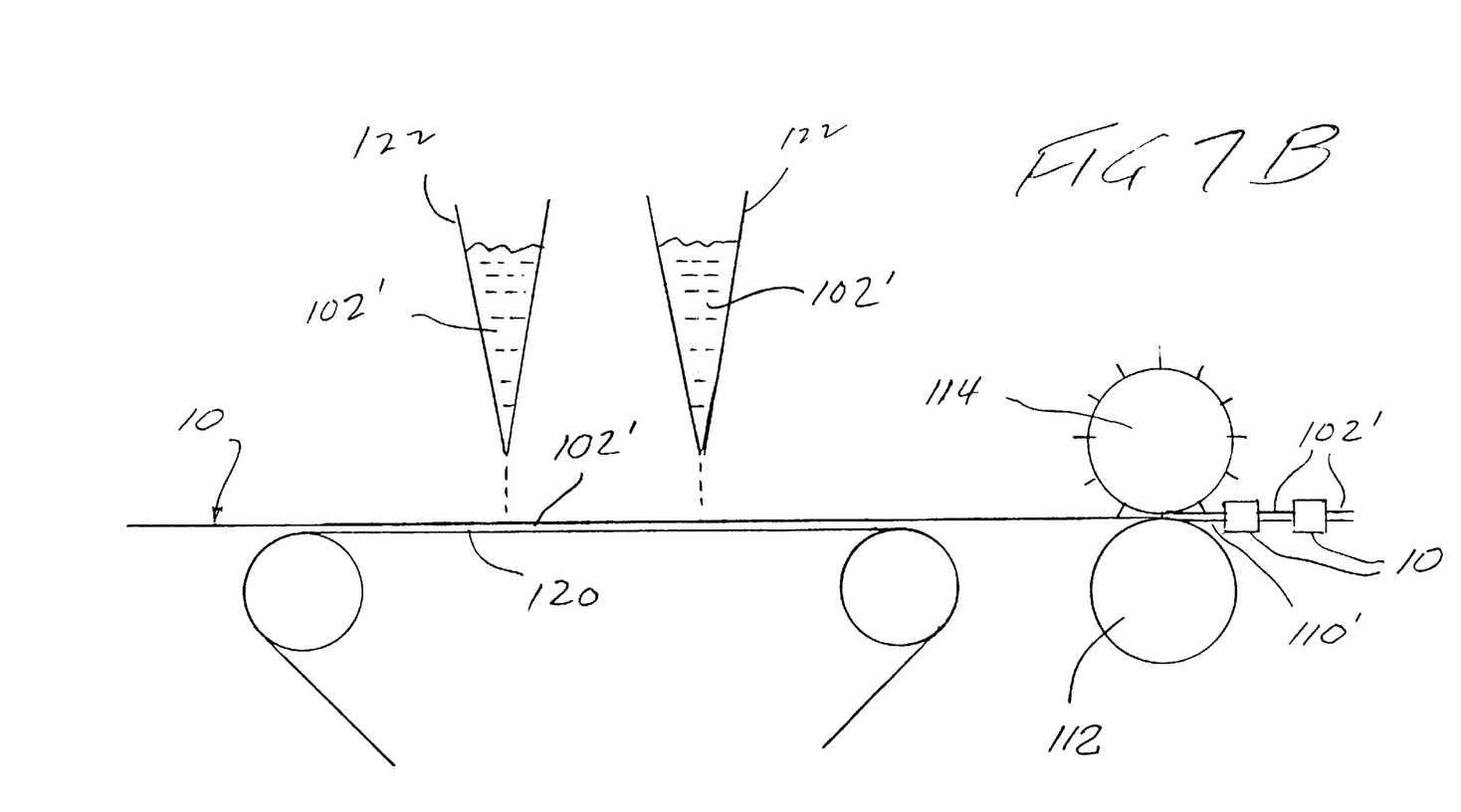

Referring now to FIG. 7B in particular, the nonwoven 10 of the present invention may be used to form, with spunbond fibers 102', a laminate according to the present invention, generally designated 110'. The nonwoven 10 has the embossed patterns of the depressions and projections, with the pattern caused by the engraved bonding roll defining closed figures elongated in the second direction (e.g., MD). The spunbond fibers 102' are in a pre-bonded state and simply scattered and dispensed by gravity from supply means 122 disposed above the nonwoven 10 as the nonwoven 10 is transported by a conveyor 120 past the supply means 122. Once the spunbond fibers 102' have been deposited on the nonwoven 10, processing at a laminating station is similar to that shown in FIG. 7A, such that the spunbond fibers 102' will soften and enter the depressions of the nonwoven 10. After lamination, the nonwoven 10 (and indeed the laminate 110') has a high MVTR and substantially no holes therein.

It will be appreciated by those skilled in the art that the bonding pattern may be effected by calendering, wherein the nonwoven is passed through the nip of a pair of calender rolls, with the heat and pressure created by the calendering rolls being used for hot fusion bonding of the fibers. On the other hand, an ultrasonic process may alternatively be used wherein the nonwoven is passed over an engraved bonding roll and the combination of ultrasonic energy and pressure creates a fusion bonding of the fibers.

Figure 8:
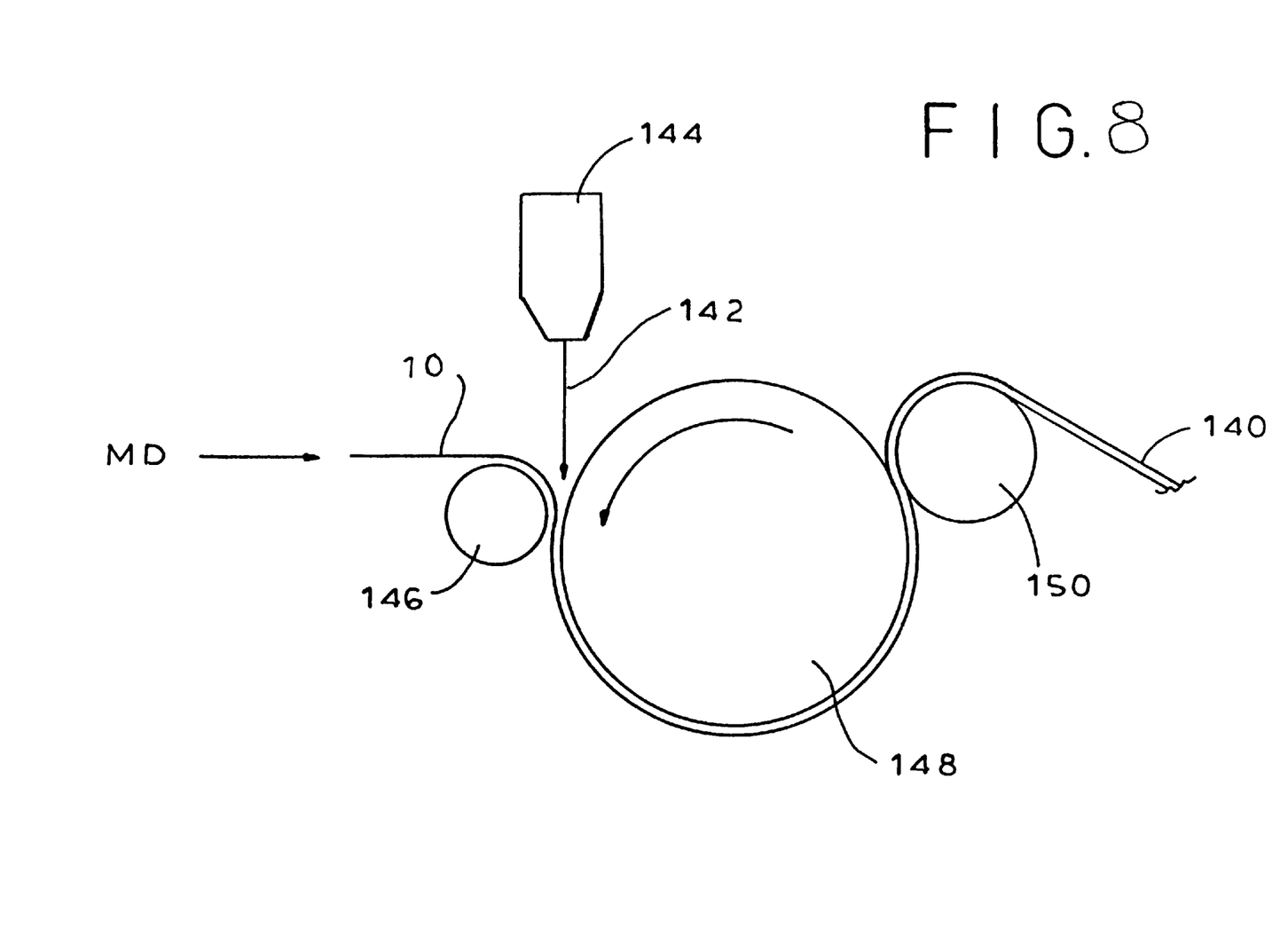
FIG. 8 is a fragmentary schematic of the process for casting an elastic film onto a nonwoven.

Referring now to FIG. 8 in particular, in another preferred embodiment of the present invention, composites or laminates 140 are provided of one of the above-described nonwoven fabrics 10 and an elastic film 142.

Disposable absorbent articles typically contain a number of different functional layers of nonwovens or composites of nonwovens and elastic film-forming polymers. Each of these layers has to meet specific requirements as to their properties since they are under stress, tension and deformation conditions during converting on the assembly or manufacturing line as well as during later use. The fibrous nonwovens provide strength to the composite as well as a soft, textile, dry feeling to at least one of the surfaces of the composite. The elastic polymer film gives certain elasticity and recovery characteristics after deformations both during converting and during later use of the absorbent article incorporating the same. A breathable elastic polymer film further gives a liquid (water) impermeability and a gas (water vapor) permeability. The problem is that the useful combinations of nonwovens and elastic films are limited to those with physical (i.e., mechanical) characteristics which are similar or at least comparable; otherwise, the structure of the composite would fracture or delaminate under stress conditions during converting or use—that is, would suffer breaking of the bonding points between the film and the nonwoven or creation of loose or broken filaments in the nonwoven.

Thus, in this process modification, an elastic film 142 is coated onto a nonwoven 40 according to the present invention, preferably using a cast film production method (i.e., direct extrusion of a molten film-forming elastic polymer 142 from a die 144 onto the fabric 40). In casting, the elastic film 142 is applied from a die 144 onto the nonwoven 40, the composite 140 then passing between a nip roll 146 and a chill roll 148 (to cool the film) before removal of the cooled composite 140 from the chill roll 148 by a peel roll 150. The cast film has a molecular orientation in the MD. Casting of the elastic film 142 directly onto the nonwoven 40 is preferable to each being separately formed and then glued or otherwise adhered together to form a laminate as it avoids the danger inherent in the use of glue (which may seal the pores required for breathability of the composite 140).

The elastic film/nonwoven composite 140 according to the present invention responds at least to limited CD deformations without a failure in either of the components thereof and without delamination of the elastic film and nonwoven composite. The composite 140 exhibits impact resistance capabilities to allow high impact microdeformations to occur without failures or fractures.

The elastic film/nonwoven composites 140 of the present invention are particularly suited for use in a variety of industrial application (such as house wrapping, surface protection/low friction layers, packaging, furniture and bedding, car covers and shoe components), a variety of hygiene applications (such as back sheet/outer covers, wastebands, stretch pants and elastic or extensible side bands), and a variety of medical application (such as surgical drapes, surgical gowns, cut-in-place gowns and sterilization wrappings).

Where the composite 140 has a low CD tensile strength, high CD elongation, and low deformation energy consumption, it may be used as a chassis material for disposable diapers and catamenials or as "stretch tabs" for the closure systems or "side panels" of diapers. Where the film 142 is liquid impermeable and vapor permeable, the composite 140 may be used as a back sheet material for disposable diapers and feminine hygiene products (such as catamenials). The resultant composite may be stretched to create breathability.

Typical elastic films 142 include the thermoplastic elastomers such as polyurethane, KRATON, silicone, the polyolefin polymers, and the like.

It will be appreciated that, whether or not the cast film production method is used, the coating of an elastic film 142 onto a nonwoven 10 according to the present invention strongly reduces breakage of the bonding points between the film and the nonwoven or the creation of loose or broken filaments in the nonwoven so long as stretching thereof occurs in the CD. This is because the material of the present invention exhibits an enhanced CD elongation so that it is able to extend in the CD along with the elastic film. Because the nonwovens of the present invention have a reduced elongation in the MD, stretching of a biaxially elastic film in the MD can still cause the breakage of the bonding points or loose or broken filaments in the nonwoven. However, as noted earlier, a high percent elongation in the CD is highly desirable in the diaper art, while a high percent elongation in the MD is not.

The materials of the present invention find utility in a wide variety of industrial applications. For example, the materials are useful as filters for air filtration, car filters, liquid filters and filter bags. The materials are also useful in industrial protective clothing such as clean room apparel, commodity consumer clothing, dust protection and chemical protection. The materials are further useful as industrial wipes such as clean room wipes, oil absorption wipes, lens cleaning wipes, and surface protection for low friction and/or non-scratch surfaces. Other industrial applications for the materials include house wrapping, packaging, furniture and bedding, car covers, insulation, battery separators, shoe components and the like.

Further, the materials of the present invention find utility in a wide variety of hygiene applications. For example, the materials are useful as topsheets, backsheets or outer covers, leg cuffs, waistbands, stretch tabs, elastic or extendable side panels, and acquisition or distribution layers.

Finally, the materials of the present invention also find utility in a wide variety of medical applications. For example, the materials are useful as surgical drapes, surgical gowns, cut-in-place gowns, shoe covers, bouffant caps and sterilization wrapping.

The specification of particular applications hereinabove is to be taken as exemplary only, and not as limiting. Uses other than the aforenoted industrial, hygiene and medical applications follow naturally from the physical and chemical properties of the materials of the present invention.

The asymmetric bonding pattern materials of the present invention find particular utility in hygienic applications, especially as topsheets, backsheets or outer covers, stretch tabs, elastic or extendable side panels and acquisition or distribution layers.

To summarize, the present invention provides a nonwoven having a non-symmetrical bonding pattern and, in particular, a low tensile and high elongation in the first direction (typically the CD) and high tensile and low elongation in the second direction (typically the MD). The nonwoven is suitable for use in the diaper-making industry, and is simple and economic to manufacture, use and maintain.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A nonwoven wherein orthogonally differential bonding provides high elongation in a first direction and low elongation in a second direction, said nonwoven having a plurality of bonding points defining a total bonding area along said second direction greater than along said first direction, said bonding points forming a uniform pattern of bond density in the first direction different from a uniform pattern of bond density in the second direction, said bonding points being closed figures elongated in said second direction and selected from the group consisting of closed figures:
   (A) oriented in parallel along said second direction axis;
   (B) oriented transverse to adjacent closed figures along said second direction axis; and
   (C) oriented in sets with proximate closed figures so as to form therebetween a closed configuration elongated in said second direction.

2. The nonwoven of claim 1 wherein the closed figures elongated in said second direction are oriented in parallel along an MD axis.

3. The nonwoven of claim 1 wherein the closed figures elongated in said second direction are oriented transverse to adjacent closed figures along an MD axis.

4. The nonwoven of claim 1 wherein the closed figures elongated in said second direction are oriented in sets with proximate figures so as to form therebetween a closed configuration elongated in the MD.

5. A laminate comprising the nonwoven of claim 1 and a second nonwoven, said nonwoven having an embossed pattern of depressions and projections, with said second nonwoven entering the depressions of said nonwoven, said pattern defining closed figures elongated in said second direction.

6. The laminate of claim 5 wherein said closed figures elongated in said second direction are selected from the group consisting of closed figures:
   (A) oriented in parallel along an MD axis;
   (B) oriented transverse to adjacent closed figures along MD axis; and
   (C) oriented in sets with proximate closed figures so as form therebetween a closed configuration elongated in the MD.

7. The laminate of claim 5, formed in a laminating station including a heated engraved hard roll adjacent one nonwoven and an unheated smooth soft roll adjacent the other nonwoven.

8. The laminate of claim 5 wherein said laminate after lamination has a high MVTR and substantially no holes therein.

9. The laminate of claim 5 wherein said second nonwoven is a spunbond.

10. The laminate of claim 9 wherein said nonwoven is a spunbond.

11. The laminate of claim 5 wherein said nonwoven is a spunbond.

12. A laminate comprising the nonwoven of claim 1 and an elastic film, said nonwoven having an embossed pattern of depressions and projections, with said elastic film entering the depressions of said nonwoven, said pattern defining closed figures elongated in said second direction.

13. The laminate of claim 12 wherein said closed figures elongated in said second direction are selected from the group consisting of closed figures:
   (A) oriented in parallel along an MD axis;
   (B) oriented transverse to adjacent closed figures along an MD axis; and
   (C) oriented in sets with proximate closed figures so as to form therebetween a closed configuration elongated in the MD.

14. The laminate of claim 12, formed in a coating station including a nip roll adjacent said nonwoven and a chill roll adjacent said elastic film.

15. The laminate of claim 12 wherein said nonwoven and said elastic film have comparable physical characteristics under stress.

16. The laminate of claim 12 wherein said elastic film is coated onto said nonwoven.

17. The laminate of claim 12 wherein said elastic film is cast coated onto said nonwoven.

18. A laminate comprising the nonwoven of claim 1 and a second material, said second material being selected from the group consisting of a second nonwoven and an elastic film, said nonwoven having an embossed pattern of depressions and projections, with said second material entering the depressions of said nonwoven, said pattern defining closed figures elongated in said second direction.

19. A member having high elongation in a first direction and low elongation in a second direction, said member being selected from the group consisting of:
   (A) a nonwoven characterized by orthogonally differential bonding and having high elongation in a first direction and low elongation in a second direction, said nonwoven having a plurality of bonding points defining a total bonding area along said second direction greater than along said first direction, said bonding points forming a uniform pattern of bond density in the first direction different from the uniform pattern of bond density in the second direction, said bonding points being closed figures elongated in said second direction and selected from the group consisting of closed figures:
      (i) oriented in parallel along said second direction axis;
      (ii) oriented transverse to adjacent closed figures along said second direction axis; and
      (iii) oriented in sets with proximate closed figures so as to form therebetween a closed configuration elongated in said second direction;
   (B) a laminate comprising said nonwoven and a second nonwoven, said nonwoven having an embossed pattern of depressions and projections, with said second nonwoven entering the depressions of said nonwoven, said pattern defining closed figures elongated in said second direction; and
   (C) a laminate comprising said nonwoven and an elastic film, said nonwoven having an embossed pattern of depressions and projections, with said elastic film entering the depressions of said nonwoven, said pattern defining closed figures elongated in said second direction.

* * * * *